(12) United States Patent
Sadhvani et al.

(10) Patent No.: US 8,600,355 B1
(45) Date of Patent: Dec. 3, 2013

(54) SYSTEMS AND METHODS FOR AUTHENTICATING APPLICATIONS FOR ACCESS TO SECURE DATA USING IDENTITY MODULES

(75) Inventors: Rita Sadhvani, Watchung, NJ (US); Ning Zhang, Warren, NJ (US); Mohammad Ashfaq Kamal, King of Prussia, PA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/474,347

(22) Filed: May 17, 2012

(51) Int. Cl.
*H04M 3/16* (2006.01)
(52) U.S. Cl.
USPC ........................................... 455/411
(58) Field of Classification Search
USPC ............ 455/466, 435.3, 41.1, 411, 558, 420, 455/404.2; 713/153, 193, 156, 152, 165, 713/185; 709/224, 229, 225, 227; 705/65
See application file for complete search history.

(56) References Cited

U.S. PATENT DOCUMENTS

| | | |
|---|---|---|
| 2005/0266883 A1 | 12/2005 | Chatrath |
| 2007/0184858 A1* | 8/2007 | Landschaft et al. .......... 455/466 |
| 2009/0163175 A1 | 6/2009 | Shi et al. |
| 2010/0180130 A1* | 7/2010 | Stahl et al. .................... 713/193 |
| 2011/0143663 A1* | 6/2011 | Renard et al. ................. 455/41.1 |
| 2013/0012208 A1* | 1/2013 | Jeong ........................ 455/435.3 |

OTHER PUBLICATIONS

Comviva: "Virtual SIM," retrieved May 16, 2012 <http://www.comviva.com/products/CVR/virtual_SIM.html>.
VMware MVP (Mobile Virtualization Platform), retrieved Jul. 19, 2011 <http://www.vmware.com/products/mobile/overview.html>.
"Blackberry Balance Technology" retrieved Jul. 19, 2011 <http://us.blackberry.com/apps-software/business/server/full/balance.jsb>.
"VMware Addresses Security Concerns for Employee-Owned Devices with Virtual Mobile OS,"retrieved Jul. 19, 2011 <http://telwares.wordpress.com/2010/12/08/vmware-addresses-security-concerns>.
"Manage Blackberry smartphones without compromise."

* cited by examiner

*Primary Examiner* — Kiet Doan

(57) ABSTRACT

A mobile station is configured to authenticate applications running thereon in order to control access by the authenticated applications to secure data stored in a subscriber identity module of the mobile station. Sensitive data securely stored in the subscriber identity module is associated with one of multiple personas implemented on the mobile station. When an application running on the mobile station requests access to the secure data, a secure domain controller processes the request and authenticates the application, for example based on an application authentication key. The secure domain controller further determines whether the application is associated with the same persona as the secure data identified in the request. If the application is authenticated, the secure domain controller then allows the application to access secure data associated with the same persona, but prevents the application from accessing secure data associated with other personas.

16 Claims, 5 Drawing Sheets

SYSTEMS AND METHODS FOR AUTHENTICATING APPLICATIONS FOR ACCESS TO SECURE DATA USING IDENTITY MODULES

BACKGROUND

Users of mobile stations are increasingly using their mobile stations in multiple distinct contexts. For example, a mobile station may be used for both work and personal activities, as well as other purposes. A mobile station stores applications and user data, including sensitive data (e.g., personal or confidential data) for use in one or more specific contexts. For example, the mobile station may store applications used exclusively for work purposes, and store other applications used exclusively for personal purposes. The mobile station may further store password or other authentication credential for exclusive work-related use, and the mobile station may store payment or other personal information for exclusive personal use. A work-related remote-access application (e.g., a virtual private networking (VPN) application) running on the mobile station may therefore use a work-related authentication credential to access the network service, while a personal payment application running on the mobile station may use the payment or other personal information (e.g., a credit card number) to make personal purchases.

Sensitive data stored on the mobile station, however, is readily accessible to these applications regardless of each application's context. As a result, personal sensitive data may be accessible by a work-related application, while work-related sensitive data may be accessible by a personal application. A need therefore exists to enable users to securely store sensitive data, and limit access to the secure data such that only those applications authenticated for the data can access the data.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various systems and methods described by way of example in this section relate to authenticating applications running on a mobile station in order to provide access by the authenticated applications to secure data stored in a subscriber identity module of the mobile station.

An exemplary mobile station includes a virtualization layer which provides multiple personas (e.g., user accounts, user profiles, or the like) on the mobile station. The virtualization layer has a secure domain controller for providing a separate secure domain for each persona. A user identity module (UIM) (e.g., a subscriber identity module or SIM) of the mobile station includes a secure storage that is generally used for storing an international mobile subscriber identity (IMSI) and a network hash key used in identifying and authenticating the mobile station on a particular wireless carrier network. In several examples, the module stores such information for two or more identities for the mobile station. In addition, the secure storage can be used to securely store sensitive data (e.g., user credit card numbers, passwords, or the like), and to store hash keys for applications that should be granted access to the secure/sensitive data. The sensitive data and application hash keys can be associated with one of a number of personas on the mobile station, such that the security domain controller of the virtualization layer limits access to secure data associated with a particular persona and only grants access to the particular persona's secure data by applications associated with the particular persona.

When an application is installed on the mobile station, the application is associated with a particular persona and a corresponding security domain. As part of the installation of the application, for example, an authentication key pair is created for the application, and the authentication key pair is stored by the application on the mobile station and stored by the UIM in association with the particular persona/security domain associated with the application. When the application requires access to secure data stored in the UIM, the virtualization layer sends an authentication request including the application's authentication key to the UIM. Upon receiving the authentication request, the UIM authenticates the application using the application's authentication key. If the authentication is successful, the UIM sends an authentication response back to the virtualization layer. In response to receiving the authentication response, the virtualization layer forwards the authentication response to the application, and instructs the secure domain controller to enable the application to access the secure domain. When the application sends a request for secure data to the virtualization layer, the secure domain controller enables the application to access the secure data stored in the UIM and associated with the secure domain/persona of the application.

Reference now is made in detail to the examples illustrated in the accompanying drawings and discussed below.

Figure 1:
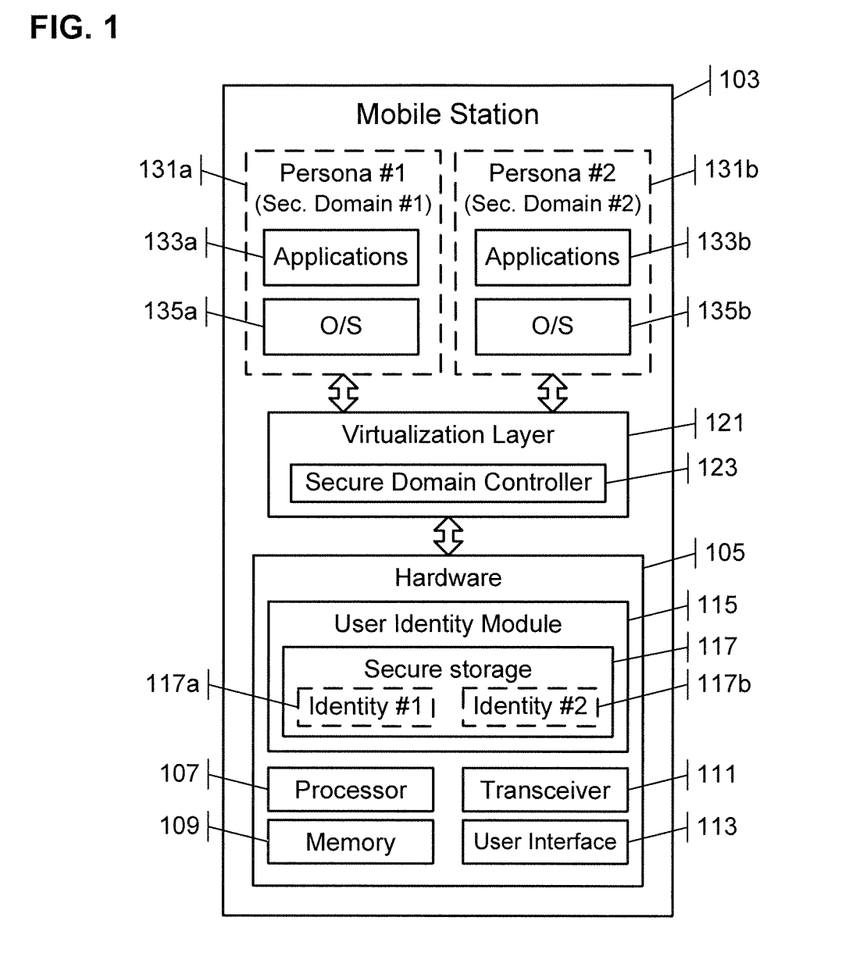
FIG. 1 is a block diagram showing exemplary components of a mobile station configured for authenticating applications for access to secure data using an identity module.

FIG. 1 illustrates a mobile station 103 that can authenticate applications to enable the applications to access secure data using a user identity module (UIM).

The mobile station 103 includes various hardware components 105, including one or more processor(s) 107, memory(ies) 109, wireless transceiver(s) 111, and user interface component(s) 113. The hardware components 105 are the building blocks for providing basic mobile station functionality. For example, the memory 109 is accessible by the processor 107, and stores program instructions for execution by the processor 107 to provide the mobile station functionality. The memory 109 can also store user data for use by various application programs running on the processor 107, such as application data, phone book data, pictures, video, music, or the like. The processor 107 is coupled to the wireless transceiver 111, which is configured to provide communication for the mobile station 103 via a mobile wireless communication network. The processor 107 is further coupled to at least one user interface element 113, and receives user input from and provides user output through the one or more user interface elements 113.

The mobile station 103 further includes a user identity module (UIM) 115, such as a subscriber identity module (SIM), which is used to identify the mobile station 103 on the mobile wireless communication network and authenticate the mobile station 103 on the network. The UIM 115 generally includes identification and authentication information for two or more identities for the mobile station 103, although in some examples, the UIM 115 may include identification and authentication information for at least one identity for the mobile station 103. The UIM 115 includes a secure memory or storage used to store identification and authentication information for use by the mobile station 103. The identification and authentication information for each identity may be stored in a separate location 117a, 117b of the user identity module 115. Each identity of the user identity module 115 can identify and authenticate the mobile station 103 as a different mobile station on the network. For example, each identity can have a different associated mobile device number (MDN) or mobile telephone number (MTN), and can cause the mobile station 103 to communicate on the network (e.g., send and receive telephone calls or other communications) under the respective identity.

The UIM 115 generally is a physical/hardware device (as shown in FIG. 1), such as a UIM card or a SIM card, that is removably inserted into the mobile station 103. In a first example, however, the UIM 115 can alternatively be software or other virtual device that is stored in a memory of the mobile station 103, and is used to identify and authenticate the mobile station for wireless communications. In a second example, the UIM 115 is formed by a combination of a physical/hardware component and an associated software/virtual component, where the software component is locked and inaccessible by a mobile station 103 unless the associated physical/hardware component is inserted into the mobile station 103. In the second example, the physical/hardware component may store an authentication or decryption key used to unlock and communicate with the software component of the UIM 115. In the second example, the software component may be stored in the physical/hardware device, and/or in a memory of the mobile station 103.

FIG. 1 shows an example in which a single UIM 115 is used in the mobile station 103, and the UIM 115 includes separate storage locations 117a, 117b for storing information for respective identities. A single UIM 115 may store information for one identity of the mobile station 103, or a single UIM 115 may store information for multiple identities as shown in FIG. 1. The mobile station 103 can more generally include two or more UIMs. In examples including multiple UIMs 115, each UIM is generally associated with a different identity of the mobile station 103 on the mobile wireless communication network, and each UIM may include a respective storage location 117a or 117b for storing information for the identity it is associated with.

As shown in FIG. 1, the identification and authentication information for each identity may be stored in a separate storage location 117a, 117b of the user identity module 115. The separate storage locations 117a, 117b may be separate physical locations, such as storage locations in different memories or UIMs 115, or separate logical locations, such as separate folders or partitions in a single memory or UIM 115. More generally, the identification and authentication information are stored in secure storage 117, which may be a secure storage of the UIM 115 (as shown in FIG. 1), a secure storage of multiple UIMs 115, or a secure storage of the mobile station 103 such as a secure portion of memory 109. The secure storage 117 may be tamper resistant storage (e.g., such as storage in a UIM 115), encrypted storage, combinations thereof, or the like. In addition to storing identification and authentication information for each identity, the secure storage 117 may store sensitive data or other data that should be stored securely. Sensitive data may include password data, payment information (e.g., credit card data), username and password information, authentication or credential information (e.g., for accessing network services), hash or encryption keys, or the like.

The mobile station 103 runs a virtualization layer 121 which can enable the station 103 to operate under one or more personas 131a, 131b (referenced generally as personas 131). The virtualization layer 121 can be implemented as software, or as a combination of software and hardware. Each persona 131a/131b can have an associated operating system (O/S) 135a/135b, and/or one or more associated applications 133a/133b. When the mobile station 103 operates under a particular persona (e.g., persona 131a), the mobile station runs the O/S 135a associated with that persona and has access to the applications 133a associated with that persona. The mobile station 103 can also have a common O/S and/or one or more common applications, such that the mobile station 103 runs the common O/S when operating under a persona that does not have an associated O/S, and such that the mobile station 103 has access to the common applications regardless of the persona the station is operating under. In some context, a persona may be referred to as an account, a user account, or a profile on the mobile station.

The virtualization layer 121 can enable the mobile station 103 to change operating personas during operation. For example, the mobile station 103 may change operating personas (e.g., start operating under a particular persona) in response to a user input to the mobile station 103. The mobile station 103 may also change operating personas in response to an event on the mobile station 103, such as in response to arrival of a scheduled time (e.g., if an operating persona is scheduled to start operating at the scheduled time), in response to receiving a call, message, or other communication associated with a persona (e.g., if a call is received from a contact associated with a particular persona, or if a call is received to a MTN or MDN associated with a particular persona), in response to an appointment (e.g., if a reminder for an appointment associated with a particular persona is presented on the mobile station), in response to activating an application associated with a particular persona, or the like.

The operating persona that the mobile station 103 is currently operating in may be indicated to a user of the mobile station 103. For example, the current operating persona may be indicated to the user using an icon or other visual indicator, such as an icon or persona name located in a corner of a display screen of the mobile station 103 and indicative of a currently operating persona. The current operating persona may alternatively or additionally be indicated to the user by changing a background image, or by presenting a notification to a user on a display of the mobile station 103. While the mobile station 103 may change operating personas automatically (e.g., in response to an event on the mobile station 103), an automatic change in the operating persona may be delayed or cancelled if the mobile station 103 is being used by a user at the time the automatic change is triggered. The mobile station may be determined to be in current use if a user application is operating, if user input is being received or has been received within a predetermined period of time (e.g., a period of 1 minute or 5 minutes); conversely, the mobile station may be determined not to be in current use if the mobile station is operating in a sleep, standby, or screen-saver mode, if the mobile station's keyboard is locked or its display screen turned off, or the like. In one example, if an automatic persona change is triggered when the mobile station is being used by a user, the user may be presented with a pop-up window including options to change operating personas immediately, delay the change in operating personas, or cancel the change in operating personas. In another example, the change in operation persona may be automatically delayed if a user is determined to be currently using the mobile station 103. A delay in changing the operating persona may cause the mobile station 103 to automatically change operating personas when the mobile station 103 is next determined not to be in current use.

In general, a mobile station 103 can operate in only a single operating persona at any time. However, in one example, a mobile station 103 may actively operate in one persona while one or more other persona(s) are running in the background. In the example, the inactive/non-operating persona(s) can thus have applications running in the background of the mobile station 103, such that the applications continue to run even though the mobile station is no longer actively operating in the applications' associated persona(s). An application running in the background may retain access to the storage of its associated persona, including the secure storage and secure domain of the associated persona.

In mobile stations 103 having multiple UIMs 115, different personas 131 may be associated with different UIMs 115. In general, each persona 131 is associated with a single identity of the mobile station 103 (i.e., there is a one-to-one correspondence between personas and mobile station identities). However, in some examples, more than one persona 131 on the station may be associated with a first UIM, and may communicate on the network (i.e., send and/or receive communications on the network) using the identity and authentication credentials of the first UIM. In the example, the remaining persona(s) 131 on the station may be associated with a second UIM, and may communicate on the network using the credentials of the second UIM. In the example, each identity of the mobile station 103 has at least one distinct persona associated therewith, such that a mobile station having two identities has at least two distinct personas. However, in the example, multiple personas may be associated with a single mobile station identity, such that a mobile station having two identities can have more than two personas. In situations in which multiple personas are associated with a single mobile station identity, one of the personas may be designated as a default persona for the mobile station identity and may be activated, by default, when the associated mobile station is required to switch to the identity (e.g., when the mobile station receives a communication associated with the identity, and switches to the identity to receive the communication).

The mobile station 103 may further include a secure domain controller 123, which may be part of the virtualization layer 121 as shown in FIG. 1. The secure domain controller 123 is a program stored in a memory of mobile station 103 for execution on a processor of the mobile station 103. The secure domain controller 123 controls access to or from a secure domain on the mobile station 103. A secure domain may include data (and/or storage locations, memories, or the like), application(s) or operating system(s), persona(s), user identity module(s), device(s), server(s), or the like. The secure domain controller 123 generally limits access to a secure domain from elements outside of the secure domain (e.g., limit access to data or applications within a particular secure domain by applications, devices, personas that are not part of the particular secure domain). The secure domain controller 123 may additionally or alternatively limit access from the secure domain to elements outside of the secure domain (e.g., limit access from applications in the particular secure domain to data or servers outside of the particular secure domain). In general, the secure domain controller 123 allows full access between elements within a single secure domain.

In the example mobile station 103 shown in FIG. 1, the secure domain controller 123 controls two secure domains, and each secure domain includes the application(s), O/S, and data associated with a corresponding one of the personas 131a, 131b. As such, a first secure domain (secure domain #1) includes the applications 133a, O/S 135a, and data associated with the first persona 131a, and a second secure domain (secure domain #2) includes the applications 133b, O/S 135b, and data associated with the second persona 131b. In addition, each secure domain includes secure data stored in secure storage 117 that is associated with the persona, such as secure data stored on the UIM(s) 115 of mobile station 103. In the example of FIG. 1, the first secure domain includes the data stored in a first secure storage location 117a of the UIM 115, while the second secure domain includes the data stored in a second storage location 117b of the UIM 115. The storage locations 117a and 117b may both be located in a single UIM 115, may be located in separate UIMs 115 of the mobile station 103, or may be located in other secure storage(s) of the mobile station 103.

In order to protect secure data on the mobile station 103, the secure domain controller 123 can associate applications with personas, so as to only permit an application to access secure data of the same persona. The secure domain controller 123 can further authenticate applications, so as to only permit authenticated applications to access secure data of the persona. The secure domain controller 123 may block access to secure data in a persona by unauthenticated applications, and block access to secure data by authenticated applications that are not associated with the persona. In particular, the secure domain controller 123 can be a hardware abstraction layer used to convert personal data into low level hardware data bound to the UIM 115. The secure domain controller 123 is then operative to grant access to (or not grant access to) a secure domain based on a determination made by the UIM 115. For example, in response to a request to access a secure domain, the secure domain controller 123 may forward an access request to a UIM 115 of the secure domain, and may permit access to the secure domain only if an access request response received from the UIM 115 indicates that access should be granted.

In addition, the secure domain controller 123 may ensure that sensitive or confidential data is stored in one or more secure storage locations. For example, the secure domain controller 123 can store sensitive data in a secure storage 117 of a UIM 115, and store the sensitive data in a storage location 117a/117b of the secure storage 117 that is associated with the correct persona. The secure domain controller 123 can alternatively store sensitive data in other secure storage locations accessible by the processor 107 of the mobile station 103, such as a secure or encrypted memory (e.g., a secure or encrypted portion of memory 109).

Figure 2:
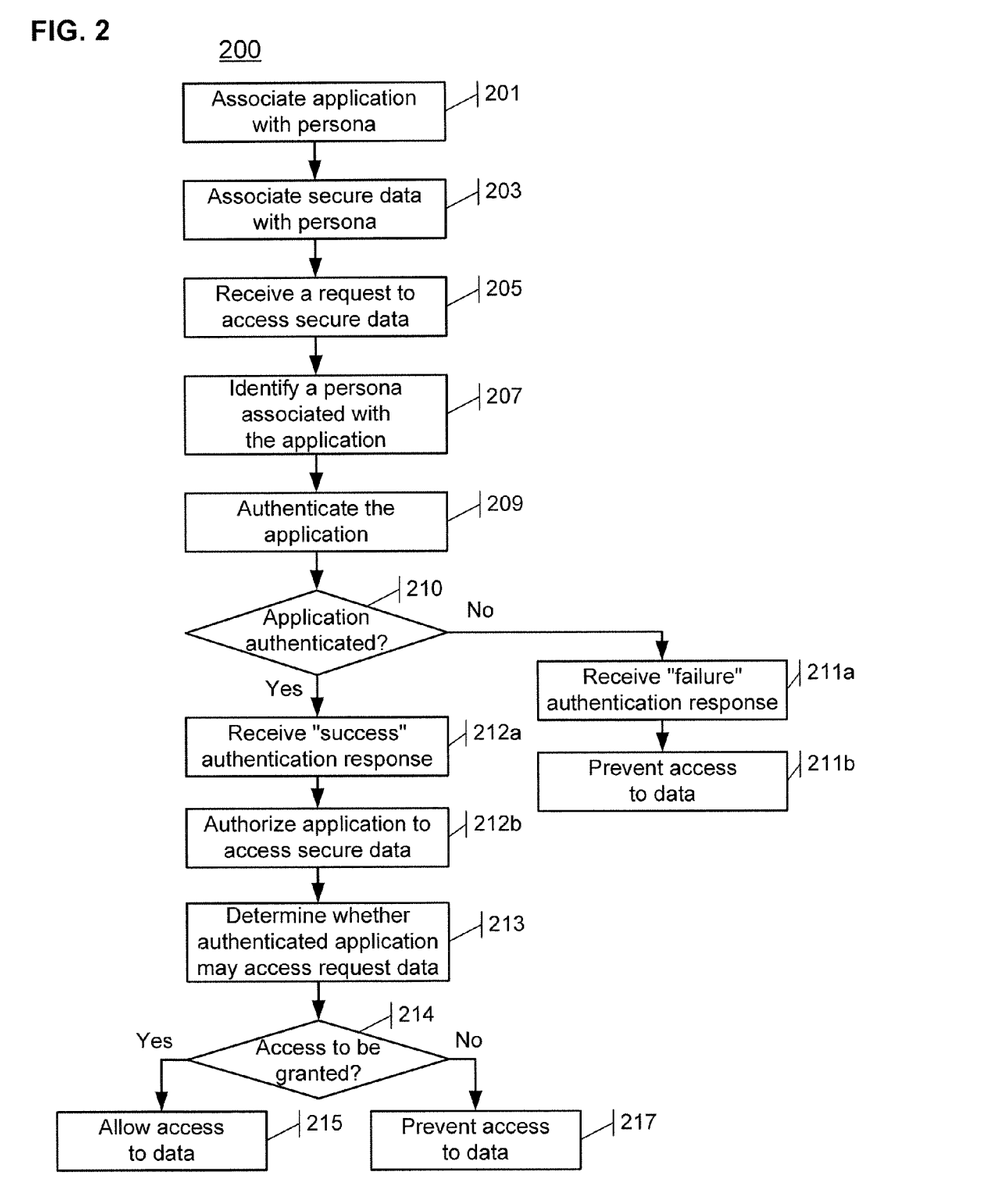
FIG. 2 is a flow diagram of an exemplary method for authenticating an application for access to secure data using identity modules.

FIG. 2 is a flow diagram showing steps of an exemplary method 200 for authenticating an application for access to secure data using identity modules.

The method 200 begins with step 201, in which an application is associated with a persona on the mobile station. As part of associating an application with a persona, the application is also associated with the security domain corresponding to the persona. The application can be associated with a persona as part of installing the application on the mobile station, as part of configuring the application for use on the mobile station, as part of configuring a persona, security domain, operating system, or the like for use with the application, as part of configuring a secure domain controller for use on the mobile station, or the like. The process of associating the application with a persona may result in the generation of an application authentication key pair. For example, the application authentication key pair can include a private key which is stored with the application data (e.g., in a memory storing the program instructions for executing the application), and a public key corresponding to the private key and stored in a secure storage location associated with the persona, such as a portion of secure storage 117 that is associated with the particular personal/security domain associated with the application (e.g., secure storage locations 117a/117b).

The method proceeds to step 203, in which secure data is associated with a persona on the mobile station. As part of associating the secure data with a persona, the secure data is also associated with a security domain corresponding to the persona. The secure data may, in general, be sensitive data (e.g., confidential data, personal data, or the like) that is stored securely on the mobile station. The secure data may be stored as encrypted data in a memory of the mobile station 103, such as a memory used to store user data in the mobile station 103. The secure data may also be stored in a secure or encrypted memory of the mobile station 103, such as a memory dedicated to storing sensitive data, a memory that forms part of a UIM 115 (such as secure storage 117). The secure data can be associated with a persona as part of storing the secure data in memory on the mobile station, as part of configuring a persona, security domain, operating system, or the like for use with the secure data, as part of configuring a secure domain controller for use on the mobile station, or the like. The process of associating the secure data with a persona may result in the secure data being encrypted using an encryption key of the associated persona, being stored in a storage location associated with the persona, or the like.

While step 203 is shown in FIG. 2 as taking place after step 201, the order of the steps 201 and 203 may be reversed or the steps may be performed substantially concurrently. In one example, steps 201 and 203 are performed by virtualization layer 121 of mobile station 103, and/or by secure domain controller 123 or another component of the virtualization layer 121. In particular, aspects of associating an application or data with a persona that involve associating the application or data with a security domain corresponding to the persona may be performed more specifically by the secure domain controller 123. In other examples, steps 201 and 203 are performed by various other modules or devices that form part of the mobile station 103 or of a mobile network on which the mobile station operates. Once steps 201 and 203 are completed, method 200 proceeds to step 205.

In step 205, a request is received to access secure data on the mobile station 103. The request may take the form of an application, running on the mobile station 103, generating and sending a request to retrieve, write, overwrite, or otherwise access secure data (e.g., user data including sensitive user data) from memory. The request may be received in, routed to, or intercepted by the secure domain controller 123 (and/or another component of the virtualization layer 121). In response to receiving (or intercepting) the request, the secure domain controller 123 transmits the request to the UIM 115. In general, the request received in and transmitted from the secure domain controller 123 includes identification for the application having generated the request as well as authentication information for the application. The authentication information generally includes the application's authentication key (e.g., the private or other key stored with the application data), a passphrase generated using the application's authentication key, an authentication certificate for the application, or the like. The request may also include identification for the persona associated with the application and/or secure data, and authentication information for the persona (e.g., an authentication key associated with the persona). In some embodiments, however, the request received in the secure domain controller 123 does not include authentication information for the application. If no authentication information is included, the secure domain controller 123 may retrieve authentication information for the application from a memory of the mobile station 103, and may include the retrieved authentication information in the request transmitted from the secure domain controller 123.

In step 207, the persona associated with the application having generated and transmitted the request is identified. The persona may be identified in the received or intercepted request by the secure domain controller 123. The persona may alternatively or additionally be identified based on the application identified in the request (which corresponds to the application having generated and transmitted the request). In one example, the virtualization layer 121 may maintain in a memory 109 of the mobile device 103 a table associating each application with a persona, and the secure domain controller 123 may thus identify the persona associated with the application based on the table. In embodiments in which the mobile station 103 has multiple UIMs 115, the virtualization layer 121 may also identify a UIM 115 associated with the persona. The secure domain controller 123 may then transmit the request to the UIM 115 associated with the identified persona.

In step 209, the application identified in the request (as above, which generally corresponds to the application having generated and transmitted the request) is authenticated. The authentication may be performed by the secure domain controller 123 and, at least in part, by the UIM 115 upon receiving the authentication request from the secure domain controller 123. The UIM 115 may retrieve the authentication information from the received request, and proceed to authenticate the application based on the authentication information. In one example, the UIM 115 may verify that the application authentication key received is a valid authentication key for a particular persona or security domain (e.g., the persona or security domain associated with the UIM 115, or the persona or security domain identified in step 207). In another example, the UIM 115 retrieves the public authentication key associated with the application identified in the request from a secure storage location associated with the persona, and uses the public authentication key to validate the request (e.g., by validating the key or passphrase included as part of the request). The authentication of the application is considered successful if the UIM 115 determines that the application is authenticated for use with the persona corresponding to the UIM. Once the application is authenticated by the UIM 115 (step 210, "Yes" branch), the UIM sends an authentication response back to the secure domain controller 123 indicating that the application has been authenticated (step 212*a*). If the application cannot be authenticated or if the application is determined not to be authenticated for use with the particular persona (step 210, "No" branch), the UIM may do nothing, or the UIM may send an authentication response indicating that the application is not authenticated. In response to not receiving an authentication response before expiration of a timeout period, or in response to receiving a "failure" authentication response indicating that the application is not authenticated (step 211*a*), the secure domain controller 123 blocks access by the application to secure data (step 211*b*). In response to receiving a successful authentication response (step 212*a*), the secure domain controller 123 forwards the authentication response to the application, and enables the application to access the secure domain associated with the persona (step 212*b*). While some of the steps involved in authenticating the application are described above as being performed by the UIM 115, all or part of the authentication steps may alternatively be performed by the secure domain controller 123 or by another component of the virtualization layer 121.

In step 213, the secure domain controller 123 determines whether the application may access the secure data identified in the request. If the application has been successfully authenticated, the secure domain controller 123 may determine whether the secure data identified in the request is associated with the same persona as the authenticated application in step 214. The secure domain may then allow the application access to the secure data identified in the request in step 215. The secure domain controller 123 may alternatively, upon authentication of the application, provide access by the application to all secure data associated with the identified persona in step 215. In general, once an application is granted access to secure data in step 215, the application may read, write, and/or over-write the secure data. However, the secure domain controller 123 may prevent access to secure data in step 217, for example if the application seeks access to secure data associated with a different persona or security domain.

Figure 3A:
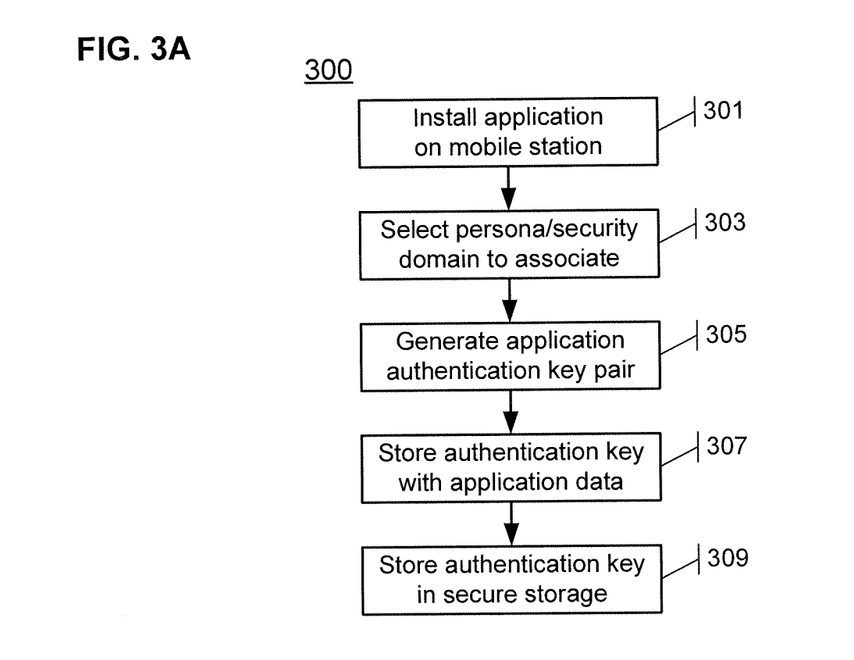
FIGS. 3A and 3B are flow diagrams respectively showing exemplary methods for associating an application with a persona and for associating sensitive or secure data with a persona.
Figure 3B:
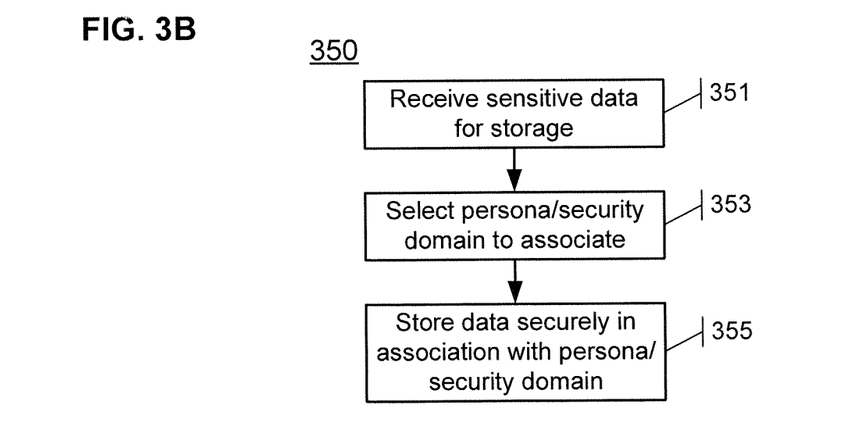

FIGS. 3A and 3B are flow diagrams respectively showing exemplary methods 300 and 350 for associating an application with a persona and for associating sensitive or secure data with a persona. The method 300 shown in FIG. 3A may be performed as part of step 201 of FIG. 2, while the method 350 shown in FIG. 3B may be performed as part of step 203 of FIG. 2. The methods 300 and 350 may be performed by the virtualization layer 121 and/or the secure domain controller 123, alone or in combination with other components of the mobile station 103 or of an associated communication network.

The method 300 begins in step 301 when an application is newly installed on the mobile station 103. As part of the installation process, the application may be configured for use in one or more personas, and/or one or more corresponding security domains, on the mobile station. While step 301 specifically refers to the installation of an application on the mobile station, the method 300 may also be initiated when configuring (or re-configuring) an application for use on the mobile station, when configuring (or re-configuring) a persona, security domain, operating system, or the like for use with the application, when configuring (or re-configuring) a secure domain controller for use on the mobile station, or the like.

In step 303, a persona and/or corresponding security domain is selected for association with the application. The persona may, by default, be selected as the persona that is active on the mobile station at the time the installation of the application is initiated in step 301. Alternatively, the persona may be user selected among the personas available on the mobile station. In one example, the persona is set by a network administrator having control of applications installed on the mobile station, or installed on a particular persona (e.g., a work-related persona) of the mobile station. The security domain corresponding to the selected persona may automatically be selected.

In step 305, an application authentication key pair is generated for the application. In one example, the application generates the authentication key pair. In another example, the virtualization layer 121 or the secure domain controller 123 generates the authentication key pair. In another example, the mobile station 103 relies on an authentication server in communication with the mobile station via a mobile communication network to authenticate the application and to generate the authentication key pair, for example in response to an authentication request generated by the virtualization layer 121 and transmitted to the server. In embodiments in which an authentication server is used, the authentication server may verify the identity of the application prior to generating the authentication key pair, so as to verify that the application is not a fraudulent application seeking access to sensitive or secure data (e.g., a virus or other malicious application).

In step 307, an authentication key of the generated authentication key pair is stored with the application data. For example, the authentication key may be the private key of the authentication key pair, and it may be stored in the memory 109 storing the application data. The authentication key stored with the application data may be used by the application to authenticate the application with the UIM 115 and/or secure domain controller 123, e.g. as done in step 209.

In step 309, an authentication key of the generated authentication key pair is stored in the secure storage 117. In particular, the authentication key may be stored in the secure storage 117 in association with (or in a storage location associated with) the personal and security domain identified in step 303. For example, the authentication key may be stored with the secure data stored in the UIM 115, or in secure storage in memory 109. In general, the authentication key stored in step 309 may be in a memory accessible by UIM 115, such that UIM 115 can retrieve the authentication key when authenticating an application (e.g., in step 209). The authentication key may be a public key that is used by the UIM 115 to validate the authentication information received from the application in a request to access secure data.

The method 350 for associating sensitive or secure data with a persona begins in step 351 when sensitive data is received for storage on the mobile station 103. The data may be received for storage from an application, a user interface 113, or from the network through transceiver 111. For example, the data may be user data related to an application, and received for storage during the course of operation of the application. The data may be user inputted data, received as part of user profile information for storage on the mobile device. The data may alternatively be data received from a network server via transceiver 111, such as authentication information for a network service, such as a security certificate received for accessing online services.

In step 353, a persona and/or security domain is selected to associate with the sensitive data. The persona may, by default, be selected as the persona that is active on the mobile station at the time the sensitive data is received in step 351. Alternatively, the persona may be user selected among the personas available on the mobile station. In one example, the persona is selected as the persona of the application having generated or supplied the data. In another example, the persona is set by a network administrator having control of the mobile station, such that the data is associated with a particular persona (e.g., a work-related persona) of the mobile station. The security domain corresponding to the selected persona may automatically be selected.

In step 355, the sensitive data is stored securely in association with the selected persona and security domain. The sensitive data may be stored in a secure storage 117 of a UIM 115, or more generally in a secure storage of the mobile station 103 such as a secure part of memory 109. For example, the data may be stored as encrypted data in a memory of the mobile station 103, such as a memory 109 used to store user data in the mobile station 103. The data may be encrypted using an encryption key of the associated persona. The data can be stored in a location associated with the persona, such as a dedicated storage location 117a/117b of the secure storage 117.

Figure 4:
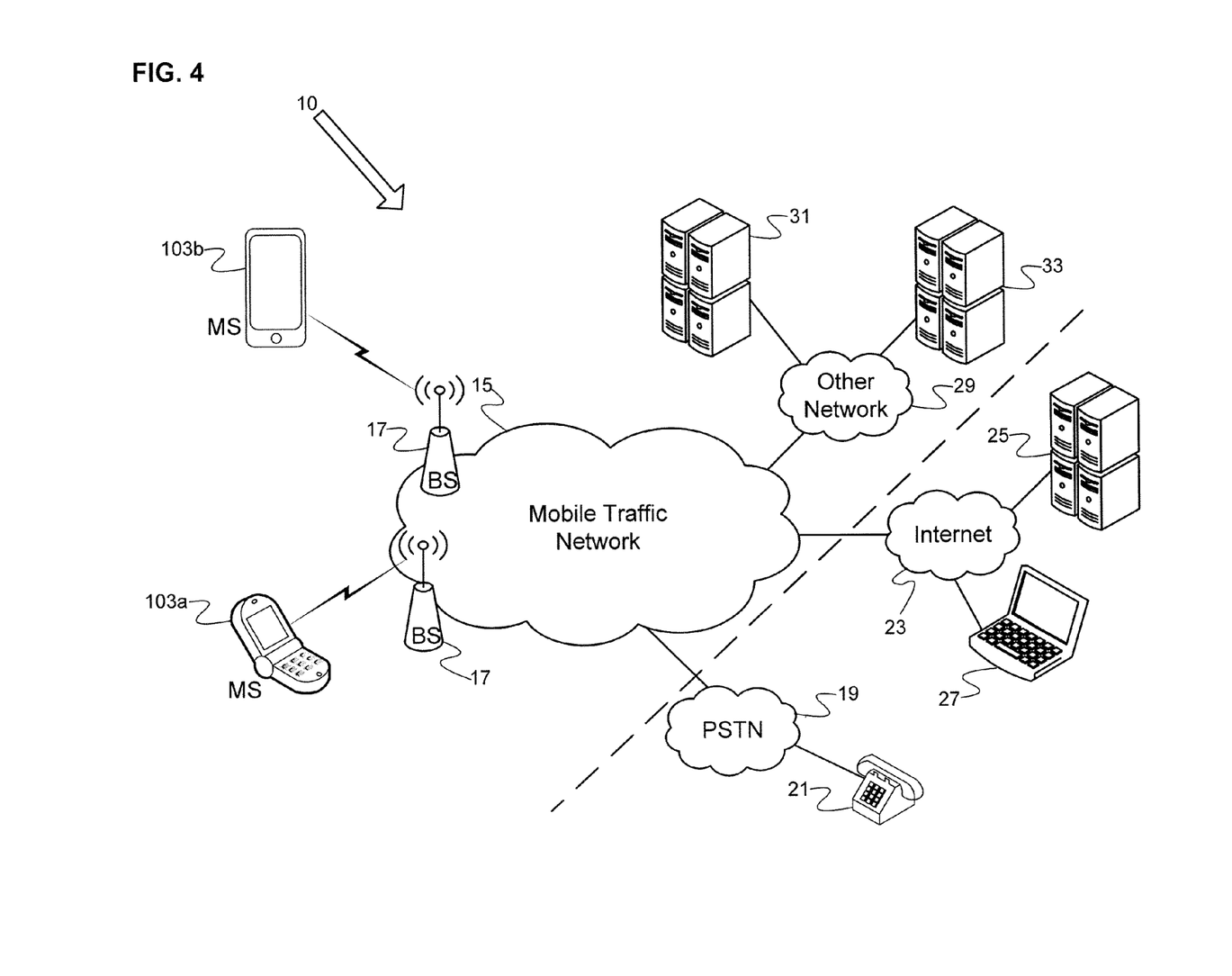
FIG. 4 is a high-level functional block diagram of an example of a system of networks/devices that provide various communications for mobile stations and support an example of the application authentication and secure data access control services.

FIG. 4 illustrates a system 10 offering a variety of mobile communication services, including communications for mobile stations configured to authenticate applications and control access by authenticated application to secure data. The example shows simply two mobile stations (MSs) 103a and 103b as well as a mobile communication network 15. The stations 103a and 103b are examples of mobile stations that may be used for the authentication of application and the controlling of access to secure data. However, the network will provide similar communications for many other similar users as well as for mobile devices/users that do not participate in the authentication and secure data access control services. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 103 may are capable of voice telephone communications through the network 15, and capable of data communications through the particular type of network 15 (and the users thereof typically will have subscribed to data service through the network).

The network 15 allows users of the mobile stations such as 103a and 103b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 103 via the Internet 23 may be with devices like those shown at 25 and 27 as well as with a variety of other types of devices or systems capable of data communications through various interconnected networks. The mobile stations 103a and 103b of users of the authentication and controlled data access services also can receive and execute applications written in various programming languages, as discussed more later.

Mobile stations 103 can take the form of portable handsets, smart-phones or personal digital assistants, although they may be implemented in other form factors. Program applications, including a secure domain controller application and/or any authenticated application programs can be configured to execute on many different types of mobile stations 103. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 103, can include one or more RANs and a regional circuit and/or packet switched network and associated signaling network facilities.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. Examples of such systems, in this case operated by the network service provider as part of the overall network 10, which communicate through the intranet type network 29, include one or more application servers 31 and a related authentication server 33.

A mobile station 13 communicates over the air with a base station 17 and through the traffic network 15 for various voice and data communications, e.g. through the Internet 23 with a server 25 and/or with application servers 31. If the mobile service carrier authenticates applications installed on a mobile station 103, and/or generates authentication key pairs for such application, the service may be hosted on a carrier operated application server 31, for communication via the networks 15 and 29. Alternatively, the authentication-related services may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication (e.g., based on mobile station credentials associated with a mobile station identity and retrieve from UIM 115), the server 33 informs the server application 31, which in turn provides access to the service via data communication through the various communication elements (e.g. 29, 15 and 17) of the network 10.

Figure 5:
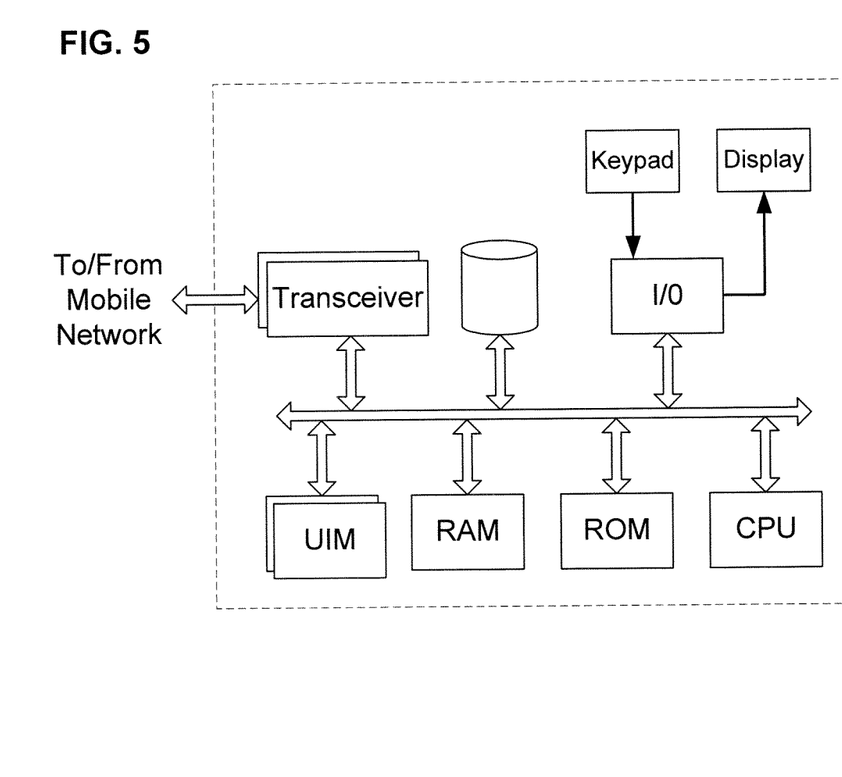
FIG. 5 is a simplified functional block diagram of a personal computer or other work station or terminal device.

As shown by the above discussion, functions relating to authenticating an application to control access to secure data may be implemented using one or more hardware platforms intended to represent a general class of mobile station. FIG. 5 provides a functional block diagram illustration of a general mobile station platform. A mobile station typically comprises a central processor or other processing device, an internal communication bus, various types of memory or storage media (RAM, ROM, EEPROM, flash memory, etc.) for code and data storage, one or more user identity modules (UIMs), user interface elements (display, touchscreen, keypad, microphone, speaker) and one or more transceivers for communication to/from a mobile communication network. The software functionalities involve programming, including executable code as well as associated stored data, e.g. files used as the authentication key pairs. The software code is executable by the processor so as to perform functions including functions of the secure domain controller. In operation, the code is stored within the mobile station. At other times, however, the software may be stored at other locations and/or transported for loading into the mobile station. Execution of such code by a processor of the mobile station enables the station to implement the methodology for authenticating applications and controlling access to secure data, in essentially the manner performed in the implementations discussed and illustrated herein.

Hence, aspects of the methods of authentication and secure data access control outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of mobile stations, servers, processors or the like, or associated modules thereof, such as various semiconductor memories, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the mobile station. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, flash memory, EEPROM, or other memories such as any of the storage devices in any mobile station(s) or the like, such as may be used to implement the secure storage 117 and/or memory 109, etc. shown in the drawings. Volatile storage media include dynamic memory, such as main memory of such a processing platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile station, comprising:
a wireless transceiver configured to provide communication for the mobile station via a mobile wireless communication network;
an identity module configured to provide secure storage for information relating to different identities of the mobile station associated with mobile station communication via the mobile wireless communication network;
at least one user interface element;
a processor coupled to the wireless transceiver and the at least one user interface element;
a memory accessible by the processor configured for program and data storage;
application programs stored in the memory; and
a secure domain controller program stored in the memory, wherein execution of the secure domain controller program by the processor configures the processor to perform functions, including functions to:
associate each of the application programs with a selected one of a plurality of personas to be implemented on the mobile station, each persona corresponding to one of the identities of the mobile station and at least one persona corresponding to each identity of the mobile station;
associate different secure data with each of the plurality of personas;
when executing each respective application program, allow the respective application program to access the secure data associated with the associated persona but prevent the respective application program from accessing the secure data associated with the other persona,
wherein allowing the respective application program to access the secure data associated with the associated persona includes performing, upon receiving from the respective application program a request to access the secure data associated with the associated persona, authentication of the respective application program using a first authentication key retrieved from the secure data and a second authentication key associated with the respective application program and included in the request to access the secure data; and
while implementing each respective persona, provide communication for the mobile station via the mobile wireless communication network utilizing information relating to the corresponding identity from the identity module.

2. The mobile station of claim 1, wherein the identity module is further configured to provide separate secure storage for the secure data associated with each of the plurality of personas.

3. The mobile station of claim 1, wherein:
each identity of the different identities of the mobile station has a different associated mobile device number (MDN) or mobile telephone number (MTN); and
each of the selected one of the plurality of personas corresponds to a different user profile on the mobile station.

4. The mobile station of claim 1, wherein the first authentication key is retrieved from the secure storage provided by the identity module.

5. The mobile station of claim 1, wherein the second authentication key is retrieved from the memory configured for program and data storage for inclusion in the request from the application program.

6. The mobile station of claim 1, wherein the identity module is a subscriber identity module (SIM) storing a network hash key used in identifying and authenticating the mobile station on a wireless carrier network.

7. A method comprising:
associating, in a mobile station having different identities associated with mobile station communication via a mobile wireless communication network, each of a plurality of application programs with a selected one of a plurality of personas to be implemented on the mobile station, each persona corresponding to one of the identities of the mobile station and at least one persona corresponding to each identity of the mobile station;
associating, in the mobile station, different secure data with each of the plurality of personas;
when a processor of the mobile station is executing each respective application program, allowing the respective application program to access the secure data associated with the associated persona in a memory of the mobile station, but preventing the respective application program from accessing the secure data associated with the other persona in the memory of the mobile station,
wherein allowing the respective application program to access the secure data associated with the associated persona includes, when executing the respective application program, performing, upon receiving from the respective application program a request to access the secure data associated with the associated persona, authentication of the respective application program using a first authentication key retrieved from the secure data and a second authentication key associated with the respective application program and included in the request to access the secure data; and
while implementing each respective persona, providing communication for the mobile station via the mobile wireless communication network utilizing information relating to the corresponding identity.

8. The method of claim 7, further comprising:
retrieving the secure data, from an identity module configured to provide secure storage for information relating to the different identities of the mobile station and for secure data associated with each of the personas, when the respective application program is allowed to access secure data associated with the associated persona.

9. The method of claim 7, wherein:
each identity of the different identities of the mobile station has a different associated mobile device number (MDN) or mobile telephone number (MTN); and
each of the selected one of the plurality of personas corresponds to a different user profile on the mobile station.

10. The method of claim 7, further comprising:
retrieving the first authentication key from the secure storage provided by an identity module configured to provide secure storage for information relating to the different identities of the mobile station.

11. The method of claim 7, further comprising:
retrieving the second authentication key from a memory of the mobile station configured for program and data storage for inclusion in the request from the application program.

12. An article of manufacture comprising:
a non-transitory storage device; and
programming in the storage device for execution by a processor of a mobile station, wherein execution of the programming by the processor configures the mobile station to perform functions, including functions to:
associate, in the mobile station having different identities associated with mobile station communication via a mobile wireless communication network, each of a plurality of application programs with a selected one of a plurality of personas to be implemented on the mobile station, each persona corresponding to one of the identities of the mobile station and at least one persona corresponding to each identity of the mobile station;
associate different secure data with each of the plurality of personas;
when executing each respective application program, allow the respective application program to access secure data associated with the associated persona in a memory of the mobile station, but prevent the respective application program from accessing secure data associated with the other persona in the memory of the mobile station,
wherein allowing the respective application program to access the secure data associated with the associated persona includes performing, upon receiving from the respective application program a request to access the secure data associated with the associated persona, authentication of the respective application program using a first authentication key retrieved from the secure data and a second authentication key associated with the respective application program and included in the request to access the secure data; and
while implementing each respective persona, provide communication for the mobile station via the mobile wireless communication network utilizing information relating to the corresponding identity.

13. The article of manufacture of claim 12, wherein:
the storage device is configured to provide separate secure storage for the secure data associated with each of the plurality of personas.

14. The article of manufacture of claim 12, wherein:
each identity of the different identities of the mobile station has a different associated mobile device number (MDN) or mobile telephone number (MTN); and
each of the selected one of the plurality of personas corresponds to a different user profile on the mobile station.

15. The article of manufacture of claim 12, wherein the first authentication key is retrieved from the secure storage provided by the storage device.

16. The article of manufacture of claim 12, wherein the second authentication key is retrieved from the memory of the mobile station.

* * * * *